(12) United States Patent
Hata

(10) Patent No.: US 6,967,333 B2
(45) Date of Patent: Nov. 22, 2005

(54) TWO DIMENSIONAL IMAGE PICK-UP APPARATUS

(75) Inventor: Fumio Hata, Mitaka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/852,196

(22) Filed: May 25, 2004

(65) Prior Publication Data

US 2004/0211911 A1 Oct. 28, 2004

Related U.S. Application Data

(62) Division of application No. 09/238,501, filed on Jan. 27, 1999.

(30) Foreign Application Priority Data

Jan. 28, 1998 (JP) ................................. 10-015611
Jan. 18, 1999 (JP) ................................. 11-008807

(51) Int. Cl.⁷ ............................................... G01T 1/24
(52) U.S. Cl. ............................. 250/370.11; 250/370.09
(58) Field of Search ....................... 250/370.11, 370.08, 250/370.09, 485.1, 581, 584; 378/189, 182, 378/187, 98.8

(56) References Cited

U.S. PATENT DOCUMENTS

| | | | |
|---|---|---|---|
| 4,727,391 A * | 2/1988 | Tajima et al. ................ | 396/518 |
| 4,763,346 A | 8/1988 | Niedospial et al. ......... | 378/187 |
| 5,025,465 A * | 6/1991 | Bauer et al. ................. | 378/169 |
| 5,043,582 A * | 8/1991 | Cox et al. ............... | 250/370.09 |
| 5,198,685 A | 3/1993 | Kitani et al. ................... | 257/82 |
| 5,381,014 A | 1/1995 | Jeromin et al. ......... | 250/370.09 |
| 5,661,309 A * | 8/1997 | Jeromin et al. ............. | 250/580 |
| 5,773,839 A * | 6/1998 | Krepel et al. ................ | 250/580 |
| 5,777,335 A * | 7/1998 | Mochizuki et al. .... | 250/370.09 |
| 5,804,832 A * | 9/1998 | Crowell et al. ............. | 250/580 |
| 5,844,961 A * | 12/1998 | McEvoy et al. ........... | 378/98.8 |
| 5,877,501 A * | 3/1999 | Ivan et al. ............. | 250/370.09 |
| 6,025,598 A * | 2/2000 | Tago ..................... | 250/370.01 |
| 6,747,277 B2 * | 6/2004 | Mori et al. ............. | 250/370.11 |
| 6,825,472 B2 * | 11/2004 | Endo ..................... | 250/370.09 |

FOREIGN PATENT DOCUMENTS

| | | | |
|---|---|---|---|
| EP | 0 767 389 | 4/1997 | |
| GB | 2057628 A * | 4/1981 | ............. F16F 6/00 |
| GB | 002139395 | 10/1983 | |
| JP | 04-360559 | 12/1992 | |
| JP | 04-361271 | 12/1992 | |
| KR | 0017673 | 7/1995 | |
| RU | 306770 | 10/1983 | |
| WO | 98/23975 | 6/1998 | |

* cited by examiner

*Primary Examiner*—Albert Gagliardi
(74) *Attorney, Agent, or Firm*—Fitzpatrick, Cella, Harper & Scinto

(57) ABSTRACT

An image pickup apparatus for X-ray photography is structurally adapted to absorb external impacts and possible resultant deformations such as deflections of the cabinet so that the interior is protected against damage and remains intact if the cabinet is deformed by the external load. The two-dimensional image pickup apparatus comprises a substrate, two-dimensional photoelectric converters formed on the substrate and an apparatus cabinet containing the substrate and the photoelectric converters in the inside, at least part of the apparatus cabinet being deformable and capable of restore the original profile or a plurality of containers such as air bags being inserted into the gap between said substrate and said apparatus cabinet to prevent the inner wall surface of said apparatus cabinet and said substrate from contacting each other.

10 Claims, 3 Drawing Sheets

TWO DIMENSIONAL IMAGE PICK-UP APPARATUS

This is a divisional application of application Ser. No. 09/238,501, filed Jan. 27, 1999, now allowed.

BACKGROUND OF THE INVENTION

1. Field of the Invention

This invention relates to a two-dimensional image pickup apparatus and, more particularly, it relates to a two-dimensional image pickup apparatus adapted to X-ray photography.

2. Related Background Art

FIG. 1 of the accompanying drawings schematically illustrates a known image pickup apparatus adapted to X-ray photography and comprising a fluorescent member (e.g. scintillator) 1 for converting X-rays into rays of visible light, photoelectric converters 2a for converting visible light into electric signals, a substrate 2b carrying the photoelectric converter 2a thereon, a base member 7 supporting the substrate 2b thereon, circuit boards 5a, 5b for processing electric signals produced by photoelectric conversion, wires connected to the circuit boards and an apparatus cabinet 8 containing the above components.

The substrate 2b arranged under the photoelectric converters 2a (hereinafter referred to simply as substrate) is typically made of glass because it is required to be free from chemical reactions with the photoelectric converters of semiconductor, resist the high temperature of the semiconductor forming process and maintain dimensional stability. The fluorescent member 1 is prepared by applying a fluorescent material of a metal compound to a resin plate. The gap separating the fluorescent member 1 and the photoelectric converters 2a has to be held to a sufficiently small value (typically less than tens of several micrometers) relative to the size of the pixels of the photoelectric converters 2a and, in most cases, the fluorescent member 1 and the substrate 2b are bonded together. Note that, in FIG. 1, photoelectric converter unit 102 refers to an assembly of a fluorescent member 1, a moisture-impermeable film 6 and other members arranged on the substrate 2b.

When the photoelectric converters 2a are required to be moisture-resistant, the fluorescent member 1 and the photoelectric converters 2a may be wrapped and hermetically sealed by a moisture-impermeable and X-ray transmissive film 6. Then, they are bonded and securely held to the base member 7 before contained in the apparatus cabinet 8 to complete the operation of assembling the image pickup apparatus for X-ray photography.

Such image pickup apparatuses are conventionally used for X-ray photography as stationary apparatus. However, in recent years, there is an increasing demand for lightweight, compact and portable image pickup apparatus adapted to rapid imaging operations for producing fine images.

Additionally, image pickup apparatus having the above described configuration are required to safeguard the substrate 2b and other related components against impacts that can be applied thereto during transportation and the apparatus are also required to be safeguarded as a whole against deformations that can be caused by the external load (mainly the weight of the person to be photographed) of the apparatus during X-ray photographing operations. To meet these requirements, then the apparatus cabinet 8 has to be structurally very robust and this necessity of being robust has been obstructing the attempt to down-size and reduce the weight of the apparatus.

SUMMARY OF THE INVENTION

In view of the above described circumstances, it is therefore the object of the present invention to provide an image pickup apparatus for X-ray photography structurally adapted to absorb external impacts and possible resultant deformations such as deflections of the cabinet so that the interior is protected against damage and remains intact if the cabinet is deformed by the external load.

According to the invention, the above object of the invention is achieved by providing a two-dimensional image pickup apparatus comprising an apparatus cabinet containing therein a substrate member and a photoelectric converter unit having a plurality of photoelectric converters formed on the substrate member at least the photoelectric converter unit being arranged on a base member and the portion of the cabinet located opposite to its light receiving section is deformable.

Preferably, the portion of the cabinet located opposite to the light receiving section can restore the original position after deformation.

Preferably, the magnitude of deformation of the portion of the cabinet located opposite to the light receiving section is greater than that of the substrate member.

According to the invention, there is also provided an image pickup apparatus comprising a substrate, a photoelectric converter unit having a plurality of photoelectric converters and a cabinet containing the photoelectric converter unit, a shock absorbing means being arranged between the photoelectric converter unit and the cabinet.

For the purpose of the invention, the shock absorbing means may be containers.

For the purpose of the invention, the containers may contain gas in a sealed state.

A two-dimensional image pickup apparatus according to the invention may further comprise a circuit board for processing electric signals from the photoelectric converters also contained in the apparatus cabinet and cooling liquid is contained in a sealed state at least in the containers held in direct contact with the electronic parts arranged on the circuit board.

DESCRIPTION OF THE PREFERRED EMBODIMENTS

Now, the present invention will be described in greater detail by referring to the accompanying drawings that illustrate preferred embodiments of the invention. However, the present invention is by no means limited to the embodiments as illustrated and described below, which may be modified appropriately in different ways without departing from the scope of the invention.

(First Embodiment)

Figure 1:
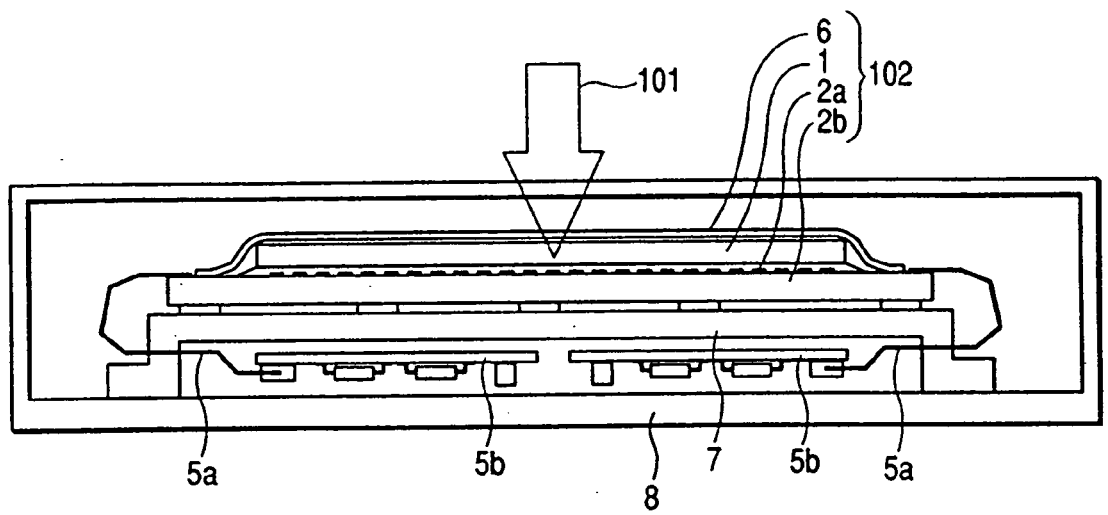
FIG. 1 is a schematic cross sectional view of a typical two-dimensional image pickup apparatus.
Figure 2:
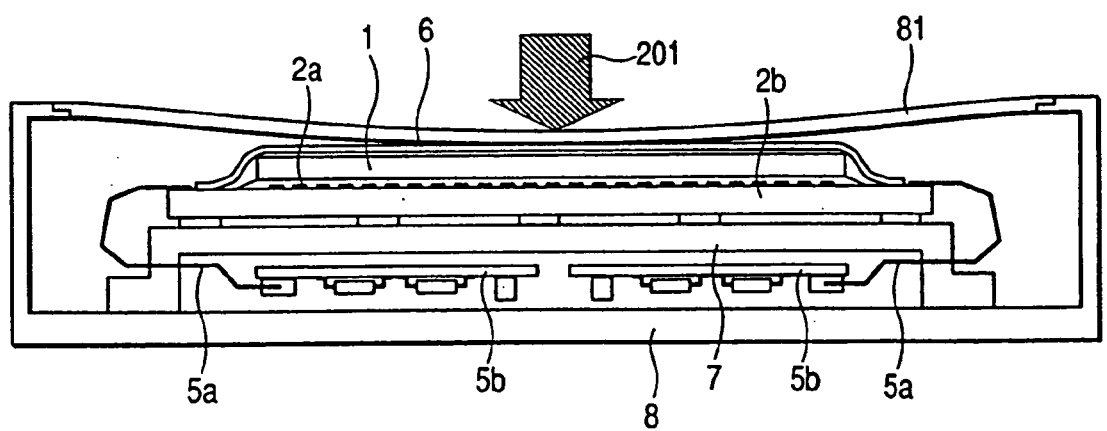
FIGS. 2, 3A, 4 and 5 are schematic cross sectional views of embodiments of two-dimensional image pickup apparatus according to the invention.

FIG. 2 is a schematic cross sectional view of a first embodiment of the invention. In FIG. 2, the components same as or similar to those of the apparatus of FIG. 1 are denoted respectively by the same reference symbols.

In this embodiment, at least the top plate 81 constituting the cabinet is made of an easily deformable material. As a result, the top plate 81 deforms only within the space between the top plate 81 and the photoelectric converter unit 102 if a small impact is applied to it so that the impact will not be transmitted to the photoelectric converter unit 102 or, if transmitted, the effect of the impact can be significantly reduced.

Additionally, the base member 7 rigidly carrying the photoelectric converter unit 102 thereon shows a rigidity (resistance against deformation by force) greater than that of the top plate 81 so that, if a load 201 is applied to the top plate 81, the magnitude of deformation of the base member 7 due to the load is smaller than that of top plate 81 and hence the impact of the load is borne by the base member 7 to protect the photoelectric converter unit 102 against deformation and damage.

The top plate 81 is preferably made of a material that is highly impact-resistant and resilient so that it may restore the original profile once the load or some other external force that has been applied to it is removed. Specific examples of materials that can be used for the top plate 81 include carbon- or Kevlar-reinforced resin, polyamide resin and polyimide resin. Above all, the use of carbon-fiber-reinforced resin is highly preferable in view of the X-ray transmittivity of the material.

(Second Embodiment)

Figure 3A:
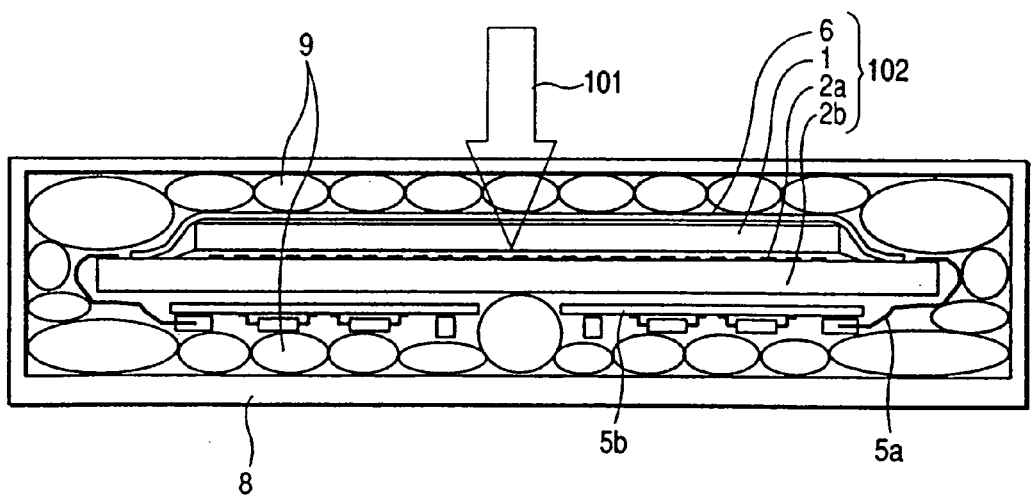
Figure 3B:
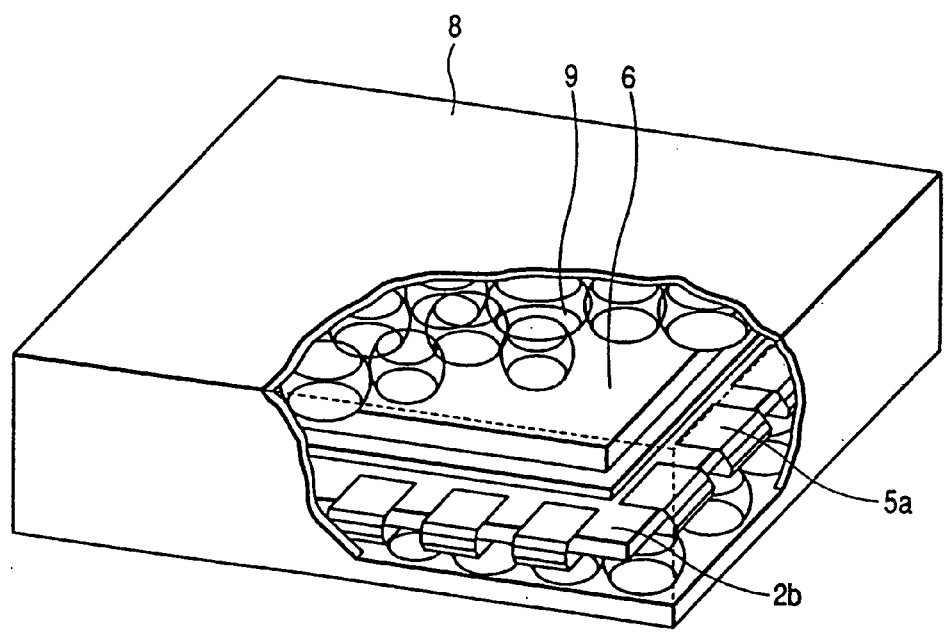
FIG. 3B is a schematic perspective view of the embodiment of two-dimensional image pickup apparatus of FIG. 3A.

FIGS. 3A and 3B schematically illustrate a second embodiment of the invention, which will be specifically described below. There are shown a fluorescent member 1, two-dimensionally arranged photoelectric converters 2a, a substrate 2b typically made of glass and a moisture-impermeable film 6, of which the moisture-impermeable film 6, the fluorescent member 1 and the substrate 2b are bonded together.

Reference symbol 5a denotes a flexible circuit board for taking out signals from the photoelectric converters and reference symbol 5b denotes a circuit board for processing signals, which circuit boards are folded and arranged on the rear surface of the substrate 2b for the purpose of downsizing. The above components are typically made of a glass plate or a semiconductor material and hence they are fragile and poorly resistant against impact.

The space between the components and the apparatus cabinet 8 is filled with containers 9 containing air or other gases in the inside in a hermetically sealed state as shock absorbing means. The containers 9 are made of an X-ray transmissive elastic material to define the positions of the photoelectric converters 2a relative to the apparatus cabinet 8 and absorb any load-induced impact through the compressive deformation of the internal gas in order to protect the substrate 2b and other fragile components against impact during transportation.

During an X-ray photographing operation, the image pickup apparatus 8 is subjected to the load of the object to be photographed and can become deflected or otherwise deformed. However, the containers 9 distribute the load and prevent the load from being intensively borne by part of the substrate 2b to get damaged.

Since the apparatus cabinet 8 itself is required to be transmissive of X-rays and lightweight as pointed out above, it is typically formed by combining a metal plate and CFRP (carbon-fiber-reinforced plastic) but the load bearing capacity of the apparatus cabinet 8 (that may be improved by increasing the thickness of the cabinet to baffle the effort of reducing its weight) does not particularly have to be taken into consideration because the containers 9 operate as reinforcement for protecting the inner components as they are elastically deformed.

(Third Embodiment)

Figure 4:
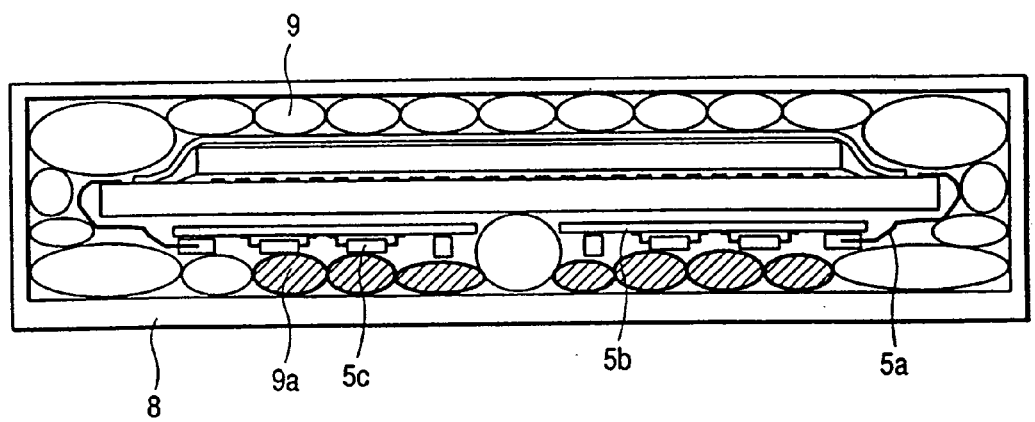

FIG. 4 schematically illustrates a third embodiment of the invention also comprising containers 9, of which at least those held in direct contact with the electronic parts 5c arranged on the circuit board 5b are made to contain cooling liquid 9a therein in a hermetically sealed state in order to cool them because many of the electronic parts 5c consume power and generate heat. As a result, the electronic parts are encouraged to emit heat so that malfunctions of the circuit due to heat can be avoided and the cabinet can be downsized in an effective way.

The containers 9 containing cooling liquid in a sealed state are preferably held in contact with the electronic parts 5c and, at the same time, with the apparatus cabinet 8. Those portions of the apparatus cabinet 8 that are held in contact with the related containers 9 is advantageously made of a thermally highly conductive material such as metal. Additionally, the apparatus cabinet 8 may be provided with heat-emitting fins (not shown), whose dimensions are, of course, confined within a permissible limit.

(Fourth Embodiment)

Figure 5:
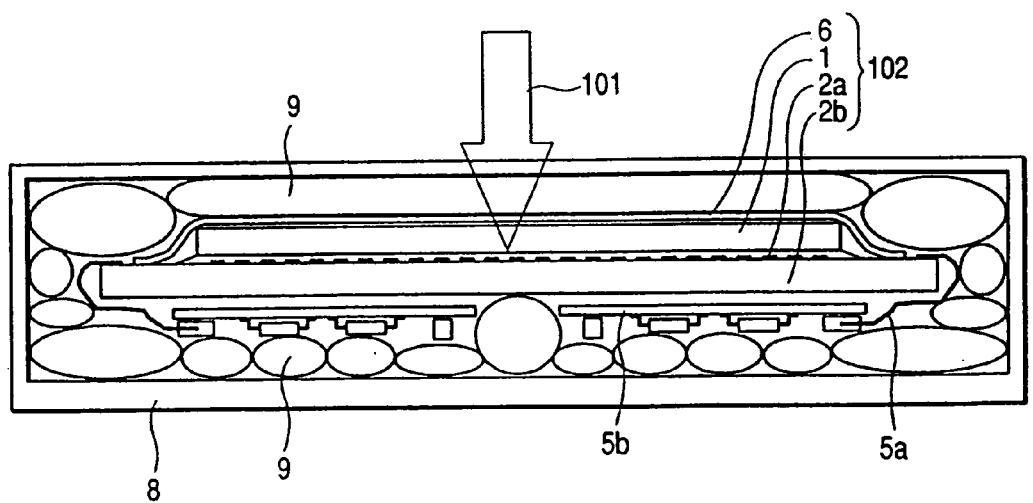

While the profile and the size of the containers 9 operating as shock absorbing means are not particularly limited, FIG. 5 shows a single container 9 arranged at the side for receiving X-rays 101 to entirely or mostly cover the light receiving surface of the photoelectric converter unit 102.

With such an arrangement, the possible absorption, if any, of X-rays by the light receiving side container 9 along the direction of transmission can be minimized to improve the resolution of the transmitted X-rays.

The containers 9 may contain a gelled or deformable solid material in place of gas or liquid, although the transmittivity of electromagnetic waves having a desired wavelength has to be carefully taken into consideration at the light receiving side of the photoelectric converter unit.

As described above in detail, an image pickup apparatus adapted to X-ray photography according to the invention shows an improved shock-absorbing property and an enhanced load bearability to allow the apparatus to be further down-sized and become lightweight.

As a result, it is now possible to realize a portable two-dimensional image pickup apparatus.

As described above, the present invention provides a two-dimensional image pickup apparatus comprising a substrate, photoelectric converters formed on the substrate and an apparatus cabinet containing said substrate and said photoelectric converters, a plurality of shock-absorbing members such as air bags being inserted into the gap between said substrate and said apparatus cabinet to prevent the inner wall surface of said apparatus cabinet and said substrate from contacting each other. With such an arrangement, if the cabinet and the top plate are deformed, damages to the inner components can be minimized and the apparatus can be down-sized and made lightweight to make it conveniently portable. When the containers or the air bags are made to contain cooling liquid, the circuit is encouraged to emit heat in an efficient way.

What is claimed is:

1. A radiation detecting device including a two-dimensional image pickup apparatus comprising:

an apparatus cabinet;

a two-dimensional photoelectric converter unit contained in said apparatus cabinet; and a shock absorber, wherein said two-dimensional photoelectric converter unit comprises a substrate member, a light-receiving surface, a fluorescent member, and a circuit board, wherein said light-receiving surface comprises a plurality of photoelectric converters formed on said substrate member, wherein said fluorescent member is arranged between said light-receiving surface and said apparatus cabinet, wherein said circuit board is electrically connected to said plurality of photoelectric converters and is arranged at a surface of said substrate member opposite to said light-receiving surface, wherein said shock absorber comprises at least a first container and a second container, and wherein the first container is arranged between said fluorescent member and said apparatus cabinet, and the second container is arranged between said circuit board and said apparatus cabinet.

2. A radiation detecting device according to claim 1, wherein said first container overlies the entire surface of said fluorescent member.

3. A radiation detecting apparatus comprising:

an apparatus cabinet;

a photoelectric converter unit contained in said apparatus cabinet; and a shock absorber, wherein said photoelectric converter unit comprises a substrate, a plurality of photoelectric converters formed on said substrate, a fluorescent member arranged at a light-receiving surface of said photoelectric converter unit, and a circuit board electrically connected to said plurality of photoelectric converters and arranged at a surface of said substrate opposite to said light-receiving surface, wherein the shock absorber comprises at least a first container and a second container, and wherein the first container is arranged between said fluorescent member and said apparatus cabinet, and the second container is arranged between said circuit board and said apparatus cabinet.

4. A radiation detecting apparatus according to claim 3, wherein each of said first and second containers comprises one or more containers.

5. A radiation detecting apparatus according to claim 4, wherein each of the one or more containers of the first and second containers contains a gas in a sealed state.

6. A radiation detecting apparatus according to claim 5, wherein each of the one or more containers of the first and second containers are air bags.

7. A radiation detecting apparatus according to claim 3, wherein said circuit board has electronic parts, and said second container is held in contact with the electronic parts of said circuit board for cooling of said electronic parts.

8. A radiation detecting apparatus according to claim 7, wherein said second container comprises one or more containers containing a cooling liquid therein.

9. A radiation detecting apparatus according to claim 3, wherein said first or second container contains a gelled material.

10. A radiation detecting apparatus according to claim 3, wherein said first container overlies the entire surface of said fluorescent member.

* * * * *

UNITED STATES PATENT AND TRADEMARK OFFICE
CERTIFICATE OF CORRECTION

PATENT NO.        : 6,967,333 B2                                           Page 1 of 1
APPLICATION NO. : 10/852196
DATED             : November 22, 2005
INVENTOR(S)      : Hata It is certified that error appears in the above-identified patent and that said Letters Patent is hereby corrected as shown below:

On Title Page
Item (54), "TWO DIMENSIONAL" should read -- TWO-DIMENSIONAL --; and
Item (57), ABSTRACT, Line 11, "restore" should read -- restoring --.

COLUMN 1:
Line 1, "TWO DIMENSIONAL" should read -- TWO-DIMENSIONAL --.

COLUMN 2:
Line 15, "member at" should read -- member, at --; and
Lines 45, 47 and 66, "cross sectional" should read -- cross-sectional --.

COLUMN 4:
Line 21, "is" should read -- are --.

Signed and Sealed this

Fourteenth Day of November, 2006

JON W. DUDAS
*Director of the United States Patent and Trademark Office*